US012645656B2

(12) United States Patent　(10) Patent No.: US 12,645,656 B2
Farkash　(45) Date of Patent: Jun. 2, 2026

(54) INSTRUCTIONS CACHING ON COLUMNAR DATABASE

(71) Applicant: Sisense Ltd., Tel-Aviv (IL)

(72) Inventor: Eldad Farkash, Tel-Aviv (IL)

(73) Assignee: Sisense Ltd., Ramat Gan (IL)

( * ) Notice: Subject to any disclaimer, the term of this patent is extended or adjusted under 35 U.S.C. 154(b) by 0 days.

(21) Appl. No.: 14/677,285

(22) Filed: Apr. 2, 2015

(65) Prior Publication Data

US 2016/0292194 A1　Oct. 6, 2016

(51) Int. Cl.
| *G06F 16/22* | (2019.01) |
| *G06F 16/23* | (2019.01) |
| *G06F 16/242* | (2019.01) |
| *G06F 16/2453* | (2019.01) |
| *G06F 16/2455* | (2019.01) |

(52) U.S. Cl.
CPC ........ *G06F 16/221* (2019.01); *G06F 16/2365* (2019.01); *G06F 16/2425* (2019.01); *G06F 16/24539* (2019.01); *G06F 16/24552* (2019.01)

(58) Field of Classification Search
CPC ......... G06F 17/30315; G06F 17/30371; G06F 17/30395; G06F 17/30457; G06F 17/3048
See application file for complete search history.

(56) References Cited

U.S. PATENT DOCUMENTS

| 8,019,735 B2 * | 9/2011 | White ............... G06F 16/24552 |
| | | 707/690 |
| 2004/0139274 A1 * | 7/2004 | Hui ........................ G11C 15/00 |
| | | 711/108 |

| 2008/0306983 A1 * | 12/2008 | Singh ................... G06F 17/246 |
| 2010/0146139 A1 * | 6/2010 | Brockmann ... H04N 21/234318 |
| | | 709/231 |
| 2012/0221774 A1 * | 8/2012 | Atkisson ............. G06F 12/0895 |
| | | 711/103 |

(Continued)

OTHER PUBLICATIONS

Nagel, F., Boncz, P., & Viglas, S. D. (Apr. 2013). "Recycling in Pipelined Query Evaluation". In Data Engineering (ICDE), 2013 IEEE 29th International Conference on (pp. 338-349). IEEE.*

(Continued)

*Primary Examiner* — Apu M Mofiz
*Assistant Examiner* — Husam Turki Samara
(74) *Attorney, Agent, or Firm* — M&B IP Analysts, LLC

(57) ABSTRACT

The presently disclosed subject matter includes a system and method of managing computer memory of a column-oriented database, which enables to reduce the tradeoff between eviction and recycling of intermediate query results and thus retain much of the recycling capability at a considerably lower computer memory cost. The computer memory comprises one or more intermediates, each intermediate being generated by execution of a respective instruction, the instruction being part of a given query. An hierarchical data-structure is generated and stored in the computer memory, wherein different nodes in the hierarchical data-structure represent different respective intermediates stored in the computer memory. Responsive to a delete command, the at least one intermediate is deleted from the computer memory, while a respective node representing the at least one intermediate is maintained in the hierarchical data-structure.

13 Claims, 10 Drawing Sheets

(56) References Cited

U.S. PATENT DOCUMENTS

| 2013/0151519 A1* | 6/2013 | Akhin | G06F 16/35 |
| | | | 707/737 |
| 2013/0159283 A1 | 6/2013 | Broll et al. | |
| 2013/0181994 A1* | 7/2013 | Soum | G06T 1/60 |
| | | | 345/440 |

OTHER PUBLICATIONS

Nagel, F., Boncz, P., & Viglas, S. D. (2013, April). "Recycling in pipelined query Evaluation". In Data Engineering (ICDE), 2013 IEEE 29th International Conference on (pp. 338-349). IEEE.
Nagel, F. (2010). "Recycling intermediate results in pipelined query evaluation", (Doctoral dissertation, MSC thesis, Tuebingen University), 74 pages.
Daniel Abadi, Peter Boncz, Stavros Harizopoulos, Stratos Idreos and Samuel Madden (2013), "The Design and Implementation of Modern Column-Oriented Database Systems", Foundations and Trends® in Databases: vol. 5: No. 3, pp. 197-280.

* cited by examiner

Obtaining query 401

Parsing query to obtain a respective instruction set 403

Updating global query tree according to instruction in the instruction set 405

Executing instructions 407

Providing final query result 409

Memory 314

Memory 314

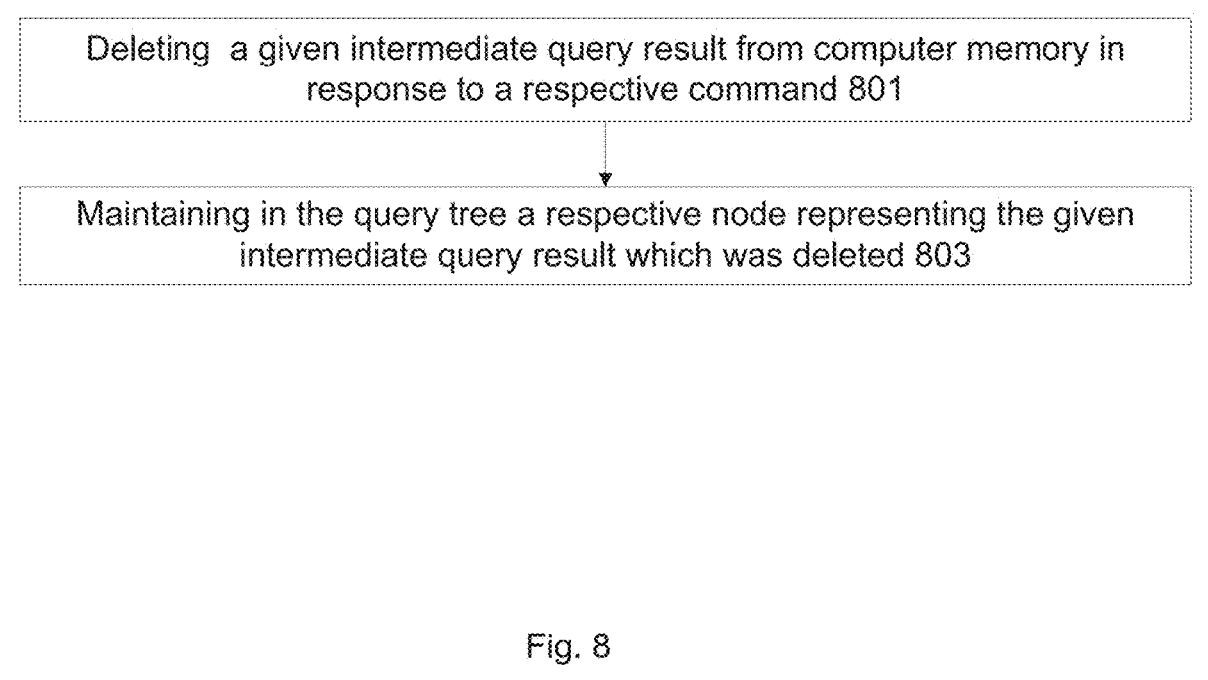

Deleting a given intermediate query result from computer memory in response to a respective command 801

Maintaining in the query tree a respective node representing the given intermediate query result which was deleted 803

Fig. 8

INSTRUCTIONS CACHING ON COLUMNAR DATABASE

FIELD OF THE PRESENTLY DISCLOSED SUBJECT MATTER

The presently disclosed subject matter relates to the field of management of column-oriented databases.

BACKGROUND

Relational row-based databases are mostly designed to store data in rows. Most relational databases process rows in a streamed fashion, thus avoiding the materialization of intermediate query results (referred to herein also as "intermediates" or "instruction data", terms which are used herein interchangeably) on most accounts. The tuple-at-a-time execution model implemented by relational databases makes the opportunities of enhancing query performance by recycling intermediates limited to materialized views, and result set caching (snapshot cache i.e. store the results for the (SQL) query that was executed). These design principles limit the opportunities for reuse of overlapping computations that might be similar between different SQL queries.

In contrast, column-oriented databases are designed to store data tables as individual objects, each object corresponding to a respective column of data. Column-oriented databases, which are more suited for online analytical processing, have a clear advantage in reusing (or recycling) intermediate query results of previously executed instructions. According to the operator-at-a-time execution model implemented by column-oriented databases, database queries are divided into discrete instructions which are executed individually and each intermediate query result, resulting from each instruction, is materialized and can serve as an input for the next operator. The available intermediate query results can also be reused in later queries sharing common instructions.

GENERAL DESCRIPTION

According to one aspect of the presently disclosed subject matter there is provided a computerized method of managing computer memory of a column-oriented database; the computer memory comprises one or more intermediates, each intermediate being generated by execution of a respective instruction, the instruction being part of a given query; the method comprising, using a computer processor for:

generating an hierarchical data-structure and storing the hierarchical data-structure in the computer memory; wherein different nodes in the hierarchical data-structure represent different respective intermediates stored in the computer memory; responsive to a delete command, instructing to delete at least one intermediate from the computer memory;

deleting the at least one intermediate from the computer memory; and maintaining in the hierarchical data-structure a respective node representing the at least one intermediate.

In addition to the above features, the method according to this aspect of the presently disclosed subject matter can optionally comprise one or more of features (i) to (xiv) listed below, in any desired combination or permutation:

i). executing a database query, comprising: dividing the query into one or more instructions to generate a respective instruction set; updating the hierarchical data-structure giving rise to an updated data-structure, wherein each instruction from among the group of instructions is represented by a respective node in the updated data-structure; for each instruction in the instruction set, determining a respective intermediate, comprising:

if a respective intermediate is available in the computer memory, retrieving the intermediate from computer memory; otherwise, if a respective intermediate is not available in the computer memory, executing the instruction to determine a respective intermediate; and providing the query result using the determined intermediates.

ii). wherein each instruction in the instruction set is represented by a query-specific leaf node in the hierarchical data-structure, and wherein executing the instruction comprises:

for each query-specific leaf node, if a respective intermediate represented by the leaf node is not available in the computer memory, retrieving from the computer memory one or more earlier intermediates, the one or more earlier intermediates are represented by one or more respective parent nodes of the query-specific leaf node; and using the one or more earlier intermediates for calculating the respective intermediate represented by the query specific leaf node.

iii). flagging the respective node representing the at least one intermediate, the flagging being indicative that a respective intermediate is not available in the computer memory.

iv). flagging one or more nodes in the updated data structure, the flagging being indicative whether or not an intermediate represented by a given node is available in the computer memory.

v). The method according to claim 4 wherein the flagging of a node is executed in any one of the following cases:

vi). wherein the hierarchical data-structure is a directed acyclic graph data-structure.

vii). wherein the hierarchical data-structure is a tree data-structure.

viii). wherein the deletion command is executed according to a predefined eviction policy; the eviction policy comprising one or more rules for evicting intermediates from the computer memory in order to clear memory space.

ix). wherein the one or more rules comprises a rule instructing to delete top memory-consuming intermediates from the computer memory.

x). wherein the one or more rules comprises a rule instructing to maintain in computer memory only intermediates represented in the hierarchical data-structure by leaf nodes.

xi). wherein the one or more rules comprises a rule instructing to delete least recently used intermediate from the computer memory.

xii). wherein the one or more rules comprises a rule instructing to determine whether to delete an intermediate from the computer memory based on a combination of parameters characterizing the intermediate comprising: a processing intensiveness parameter and a computer memory consumption parameter.

xiii). wherein the one or more rules further include a weight factor for each one of parameters.

xiv). in the event that a respective intermediate is not available in the computer memory, determining based on predefined rules whether to maintain in the computer memory or delete from the computer memory the respective intermediate.

According to another aspect of the presently disclosed subject matter there is provided a computer device operating in a column-oriented database management system configured to manage computer memory; the computer memory comprises one or more intermediates, each intermediate being generated by execution of a respective instruction, the instruction being part of a given query; the computer device comprises or is otherwise operatively connected to at least one computer processor and configured to:

generate an hierarchical data-structure and storing the hierarchical data-structure in the computer memory; wherein different nodes in the hierarchical data-structure represent different respective intermediates stored in the computer memory; responsive to a delete command, the delete command instructing to delete at least one intermediate from the computer memory:

delete the at least one intermediate from the computer memory; and maintain in the hierarchical data-structure a respective node representing the at least one intermediate.

According to another aspect of the presently disclosed subject matter there is provided a database management system comprising a query kernel of a column-oriented database management system configured to manage computer memory; the computer memory comprises one or more intermediates, each intermediate being generated by execution of a respective instruction, the instruction being part of a given query; the query kernel being operatively connected to at least one computer processor and configured to:

generate an hierarchical data-structure and store the hierarchical data-structure in the computer memory; wherein different nodes in the hierarchical data-structure represent different respective intermediates stored in the computer memory; responsive to a delete command, the delete command instructing to delete at least one intermediate from the computer memory:

delete the at least one intermediate from the computer memory; and maintain in the hierarchical data-structure a respective node representing the at least one intermediate.

According to another aspect of the presently disclosed subject matter there is provided a non-transitory program storage device readable by a machine, tangibly embodying a program of instructions executable by the machine to perform method steps of managing computer memory of a column-oriented database; the computer memory comprises one or more intermediates, each intermediate being generated by execution of a respective instruction, the instruction being part of a given query; the method comprising:

generating an hierarchical data-structure and storing the hierarchical data-structure in the computer memory; wherein different nodes in the hierarchical data-structure represent different respective intermediates stored in the computer memory; responsive to a delete command, the delete command instructing to delete at least one intermediate from the computer memory:

deleting the at least one intermediate from the computer memory; and maintaining in the hierarchical data-structure a respective node representing the at least one intermediate.

The computer device, the DBMS and the program storage device disclosed in accordance with the presently disclosed subject matter can optionally comprise one or more of features (i) to (xiv) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 8 is a flowchart of operations carried out during an eviction process, according to examples of the presently disclosed subject matter.

Figure 1:
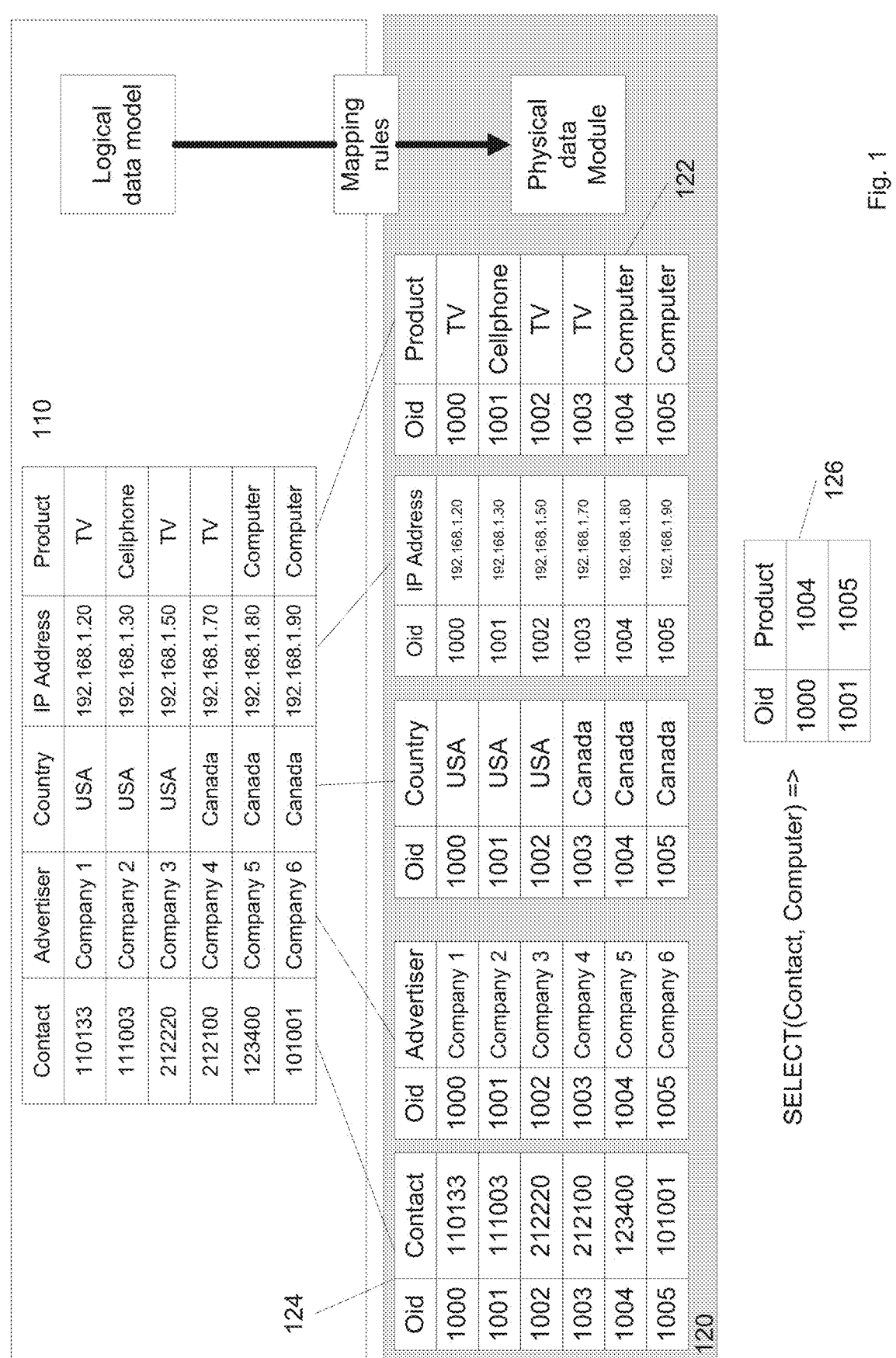
FIG. 1 is a schematic illustration demonstrating principles of a column-oriented database.

It is noted that elements in the drawings are not necessarily drawn to scale.

DETAILED DESCRIPTION

Unless specifically stated otherwise, as apparent from the following discussions, it is appreciated that throughout the specification discussions utilizing terms such as "instructing", "generating", "deleting", "maintaining" or the like, include action and/or processes of a computer device configured with data processing capabilities that manipulate and/or transform data into other data, said data represented as physical quantities, e.g. such as electronic quantities, and/or said data representing the physical objects.

The terms "computer", "computer/computerized device", "processing unit", "machine" or variation thereof should be expansively construed to cover any kind of electronic device with data processing capabilities, including, by way of non-limiting example, a processor (e.g. digital signal processor (DSP), a microcontroller, a field programmable gate array (FPGA), an application specific integrated circuit (ASIC), etc.), or a device comprising a processor and computer memory such as a personal computer, a server, a computing system, a communication device, any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiments) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 3:
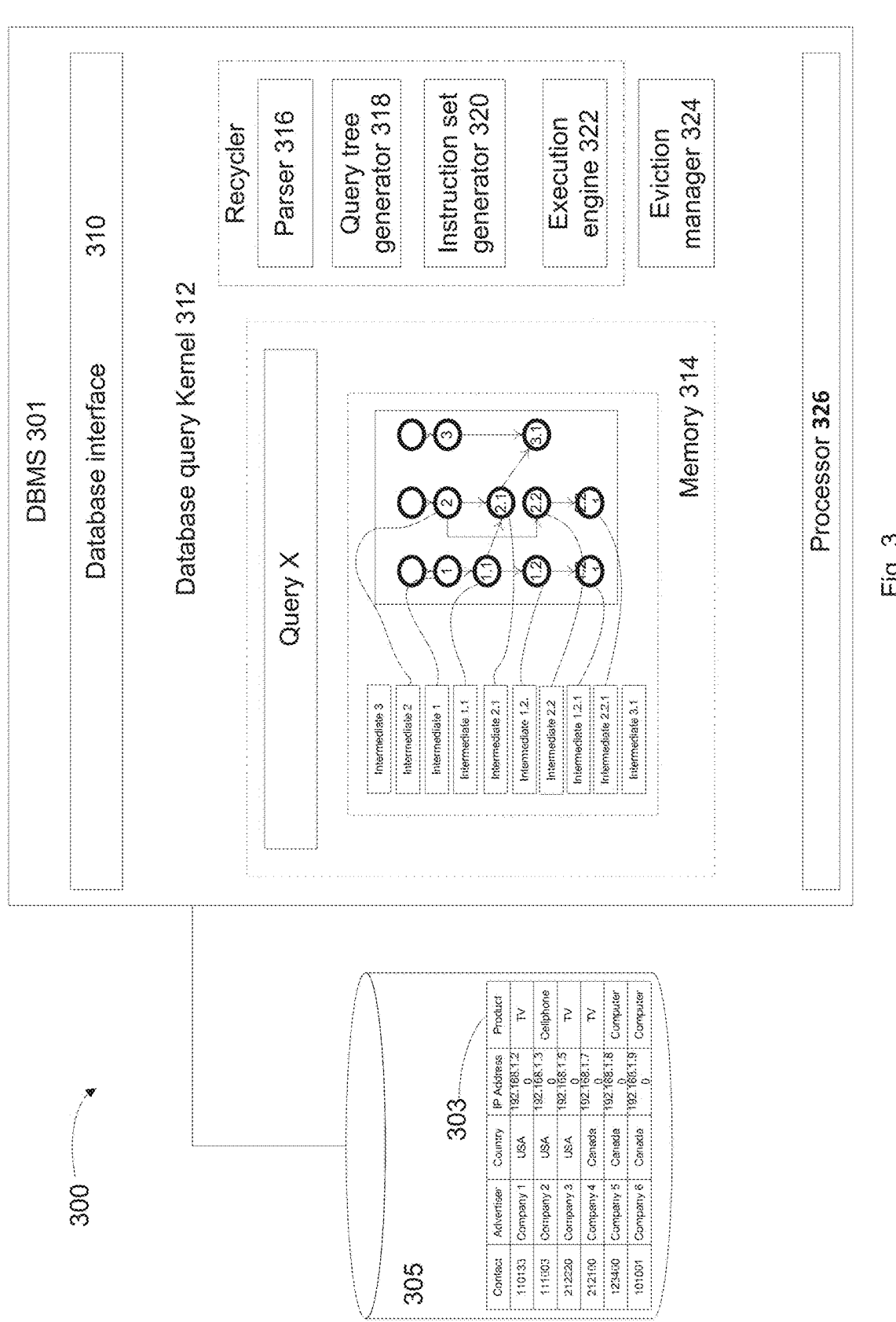
FIG. 3 is a functional block diagram of a database management system, according to examples of the presently disclosed subject matter.
Figure 4:
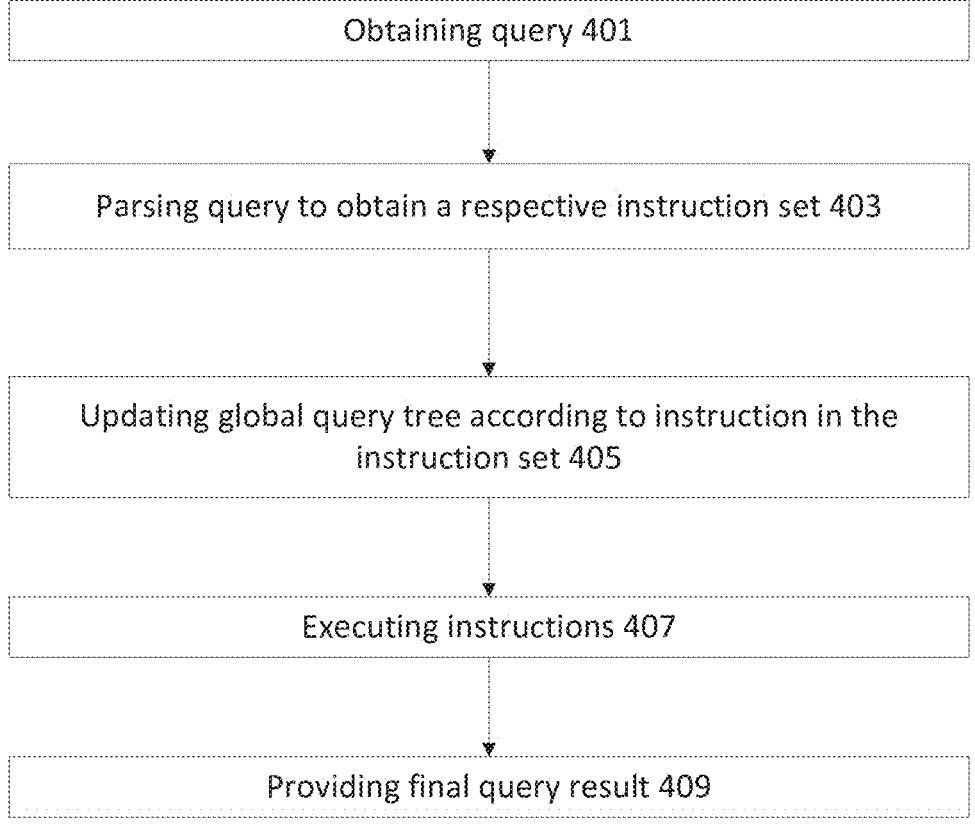
FIG. 4 is a flowchart of operations carried out in response to a database query, according to examples of the presently disclosed subject matter.

In embodiments of the presently disclosed subject matter, fewer, more and/or different stages than those shown in FIGS. 4, 5 and 8 may be executed. In embodiments of the presently disclosed subject matter, one or more stages illustrated in FIGS. 4, 5 and 8 may be executed in a different order and/or one or more groups of stages may be executed simultaneously. Functional elements in FIG. 3 can be made up of a combination of software and hardware and/or firmware that performs the functions as defined and explained herein. Functional elements in FIG. 3 can be operatively connected to a computer or can be a part of computer (e.g. implemented on a non-transitory computer memory), the processing unit being configured for executing instructions for performing the respective functions.

The terms "intermediate query results", "intermediates" or "instruction data" refer to the data resulting from the execution of an instruction and are used interchangeability herein; the instruction is an operation being part of a query and performed on one or more columns in the database.

In the following description certain examples are described in relation to MonetDB [MonetDB 2010] column-oriented database. However, this is done by way of non-limiting example only and the principles disclosed herein may be similarly applicable in other types of column-oriented databases.

Bearing the above in mind attention is now brought to FIG. 1 which is a schematic illustration demonstrating some principles of column-oriented database. Table 110 is a relational two dimensional table which represents the logical data model of the data stored in the database. Each column in table 110 comprises a set of data values pertaining to a particular type, one for each row of the table. The physical layout of the stored data is illustrated at the bottom part of the FIG. 120). Each column in table 110 is stored independently as a separate data object. Storing each column separately in a computer data storage (including for example hard disk drives and/or solid state disks) enables queries to read only the needed attributes from the relevant data object rather than having to read entire rows from the disk and discard unneeded attributes once in memory, as done in the row-oriented approach. As data transfer costs from computer data storage often represent a major performance bottleneck in database systems, using a column-oriented database may considerably increase efficiency of query execution, especially in analytical database processing.

For example, in MonetDB architecture, which was designed primarily for data warehouse scenarios, each column is represented by a respective binary association table (BAT) and the data is manipulated using BAT algebra which consumes BATs and generates new BATs. Each BAT is a two column table with one column storing the data value and the other storing a virtual ID value effectively being the array index of the column.

MonetDB's operator-at-a-time execution model and BAT algebra enables to separate a query (e.g. an SQL query) into individual instructions, where each instruction is processed individually. Each execution of each individual instruction generates a respective intermediate query result which is a data object (e.g. represented by a respective BAT) independent from all previous data objects.

For example, according to MonetDB's BAT algebra the query: Select (Contact, Computer) made on database 120 would generate new BAT 126 (i.e. intermediate query result) which would be stored as a separate data object. BAT 122 and BAT 124 are not changed by this operation.

Figure 2:
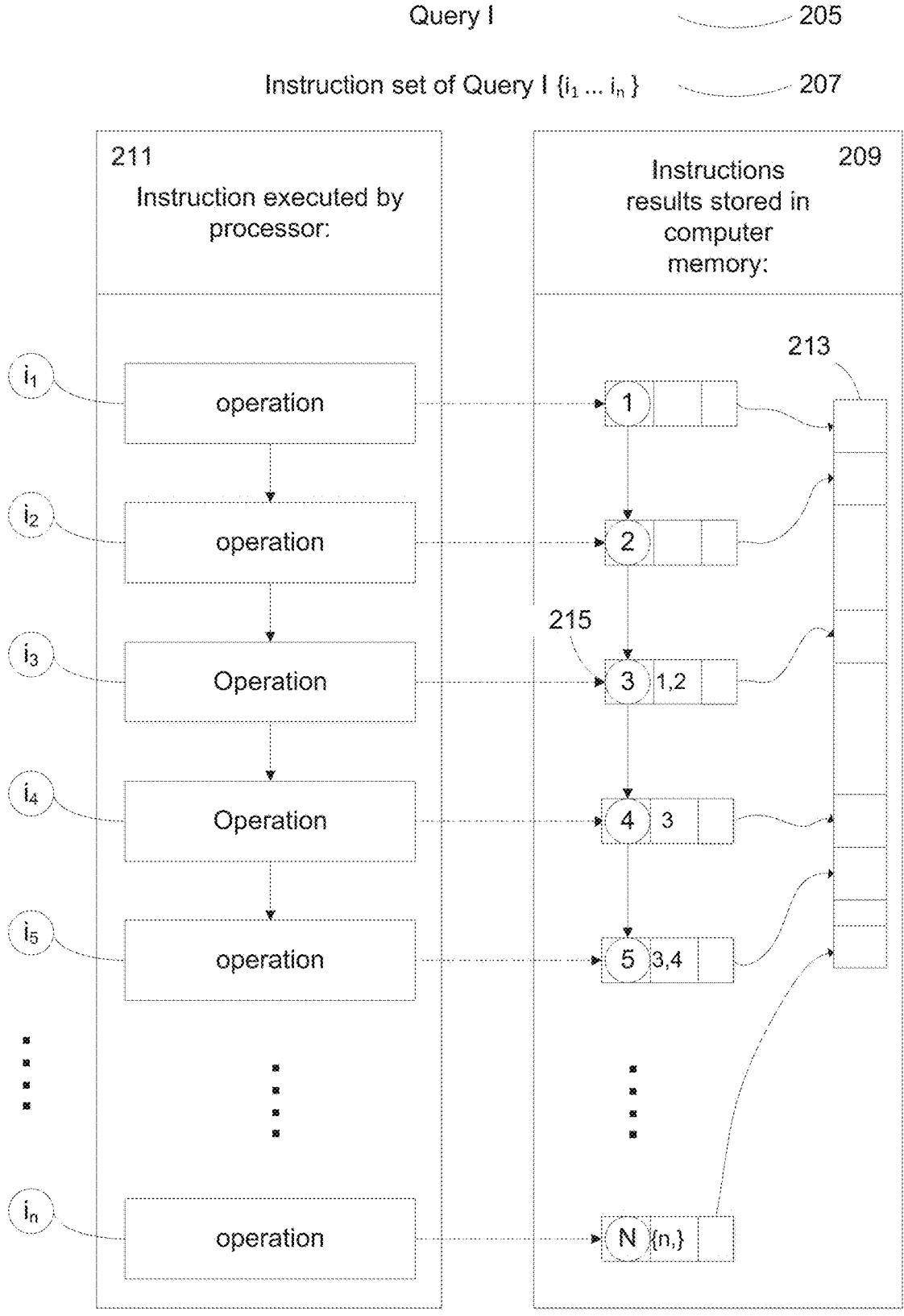
FIG. 2 is a schematic illustration demonstrating some principles of DBMS computer memory management as known in the art.

FIG. 2 is a schematic illustration demonstrating principles of computer memory management as known in the prior art. The principles described with respect to FIG. 2 are implemented for example by MonetDB column-oriented DBMS (Database management system). Query I (205) is parsed and divided into individual instructions, thus generating a respective instruction set (207). Each instruction in the instruction set represents a logical operation performed on one or more columns in the database. Consider the following example of a query:

---

SELECT Advertiser, Country, Count (Distinct "IP Address") from Table 110 GROUP By Advertiser, Country

---

Instructions are executed by the query kernel in a DBMS. During the execution of a query, query kernel of column-oriented databases is enabled to read from the data storage (e.g. computer hard drive or solid state disk) to the computer memory the attributes relevant to a current instruction. Intermediates resulting from the execution of respective instructions are written to the computer memory. The intermediates are represented by a data-structure (e.g. list or array) also stored in the computer memory. The data-structure provides a logical representation of the intermediate instruction results of one or more query.

According to the previously known paradigm, each node (e.g. nodes 1 to n stored in computer memory 209 (shown on the right side of FIG. 2) represents an instruction (e.g. instruction $i_1$ to $i_n$ executed as part of process 211 shown on the left side of FIG. 2) and points to the respective instruction data (213) also stored in the DBMS computer memory.

During the execution of a given query, for each given instruction in the respective instruction set, it is determined whether the instruction is represented in the data-structure stored in computer memory 209. Intermediates which are available in the computer memory are not re-calculated but are rather recycled and retrieved from the computer memory. Recycling of intermediates shortens query results retrieval time and improves the overall system performance.

Despite the performance advantage it provides, recycling is limited due to consumption of the computer memory storage space by intermediates as more queries are being executed. In order to avoid memory exhaustion and enable continuous operation of the DBMS, it is necessary to implement a memory eviction policy which frees memory space and enables storing new instruction data. The eviction policy is based on predefined rules for deciding which intermediates to evict from the computer memory. Once a decision is made, the corresponding nodes are deleted from the data-structure in the computer memory together with instruction data corresponding to the deleted nodes.

According to the prior art both the node and the respective instruction data represented by the node are tied together in the eviction process and they are both deleted together. Thus, during eviction of a node, the related metadata, as well as the respective instruction data, are deleted together and become unavailable.

As mentioned above, a query is executed in a progressive process where intermediates resulting from previously executed instructions in an instruction set are used as input for executing other instructions in the same instruction set. This is schematically illustrated in FIG. 2 by the numbers written within the center of some of nodes 1 to N. These numbers indicate which previously calculated intermediates were used for calculating the intermediate stored with reference to the current node. For example, intermediate 3 (215) is the result of the execution of instruction $i_3$ where the intermediate stored in node 1 (result of instruction $i_1$) and node 2 (result of instruction $i_2$) are used as input during the execution of instruction $i_3$.

When a node is deleted from the data-structure, the descendant nodes of the deleted node are cut off from their parent node (they become "orphan" nodes) as a result of the deletion, and are thus effectively deleted as well. In practice, responsive to a command to delete one node, all descendant nodes of the deleted node may be actively deleted as well.

Hence, according to the prior art model, a tradeoff exists between eviction and recycling. While eviction clears memory space, which can be used for storing new intermediates, it can also cause considerable performance degradation resulting from the inability to reuse the evicted instruction data of the deleted node and its deleted descendant nodes.

For example, one type of eviction policy includes an eviction rule instructing to evict intermediate results which consume the greatest amount of memory space (top memory-consuming intermediate query). Indeed evicting the top memory-consuming intermediates from the computer memory would clear valuable memory space. However, often top memory-consuming intermediates are also linked to a sequence of nodes, each node in the sequence representing a more recently executed instruction. Therefore, deletion of top memory-consuming nodes may have the effect of losing additional instruction data related to nodes descending from the deleted nodes. Another possible eviction policy can be based on least recently used (LRU) policy. Similar consequences may be observed when using an LRU based eviction policy.

According to an aspect of the presently disclosed subject matter a system and method of DBMS computer memory management is disclosed, which enable to reduce the tradeoff between eviction and recycling of intermediate query results and thus retain much of the recycling capability at a considerably lower computer memory cost. Accordingly the disclosed method and system improves the performance of a database management storage system.

As mentioned above, DBMS of column-oriented databases implementing an operator-at-a-time execution model can increase querying efficiency by recycling intermediate execution results. Different to previously known techniques, rather than using an array or list, it is suggested herein to use a hierarchical data-structure (e.g. directed acyclic graph or tree) for representing progression of instructions of one or more queries. The hierarchical data-structure can be used for recording and mapping the respective queries. For clarity purposes only, without any intent to limit the scope of the disclosed subject matter, in the following discussion the term "query tree" is used by way of example instead of the more general term "hierarchical data-structure".

Each instruction in an instruction set of a query executed by the query kernel is represented by a respective node (also known as entry or vertex) in the query tree. A node in the query tree comprises metadata identifying a corresponding instruction and is linked to the instruction data itself which is stored separately in the computer memory.

Furthermore, according to an example of the presently disclosed subject matter, nodes are not deleted from the query tree which mostly grows in size. During an eviction process, one or more intermediates are deleted from the computer memory, while the one or more respective nodes, representing the evicted intermediates in the query tree, are not deleted and are maintained in the query tree.

By leaving historical nodes in the query tree, the interrelations between the nodes representing both currently evicted and currently stored intermediates are maintained and can be retracted during a recycling process.

This approach enables to implement a variety of evicting policies which conserve much of the recycling capability with a considerably lower cost on the memory. For example, this approach allows preserving intermediates represented by low level nodes in the query tree (e.g. leaf nodes) in the computer memory while evicting intermediates represented by higher level nodes (the parents nodes) in the query tree.

FIG. 3 is a functional block diagram of a database management system in accordance with examples of the presently disclosed subject matter. Storage system 300 comprises query database management system (DBMS) 301 operatively connected to data storage 305 configured to implement a column-oriented database 303 for storing data. Data storage 305 comprises a physical storage space with one or more storage devices. The storage devices may be any one of Hard Disk devices (HDD) or Solid State Drives (SSD, comprising for example, a plurality of NAND elements) or any other appropriate data storage device. DBMS 301 is configured in general to enable control and management of the database 303 and to allow execution of various database related operations such as definition, creation, querying, update, and administration of databases.

According to some examples of the presently disclosed subject matter, DBMS 301 comprises interface 310 configured to provide access to the query kernel 312 and enable interaction of users or other external applications or devices to database 303. Query kernel 312 can comprise for example: parser 316; query tree generator 318; instructions set generator 320; execution engine 322; and eviction policy 324. Query kernel also comprises computer memory 314 and cache memory. Query kernel 312 is operatively connected to one or more computer processors 326 configured, inter alia, to execute various query kernel operations.

FIG. 3 also schematically illustrates intermediate query results (instruction data i to n) stored in computer memory 314 along with query tree 320 logically representing the intermediates stored in computer memory 314.

FIG. 4 is a flowchart illustrating a sequence of operations performed during query execution according to examples of the presently disclosed subject matter. For better clarity, operations in FIG. 4, (as well as FIGS. 5a and 5b below) are described with reference to corresponding functional elements which are illustrated in FIG. 3. However, this is done by way of example only and thus should not be construed to limit the scope of the presently disclosed subject matter to the specific structure of the system exemplified in FIG. 3.

In general, query kernel 312 is configured to execute (with the help of processor 326) queries and manage resources such as computer memory 314. As shown, one or more queries are received at query kernel 312 (block 401) where each query is parsed to a set of discrete instructions (block 403) giving rise to a respective instruction set. Query parsing and generation of the instruction set can be carried out for example by parser 316.

As explained above, query kernel 312 can be configured to store in memory 314 a global query tree logically representing currently available intermediate query results in the computer memory, generated during the execution of one or more queries.

Figure 5A:
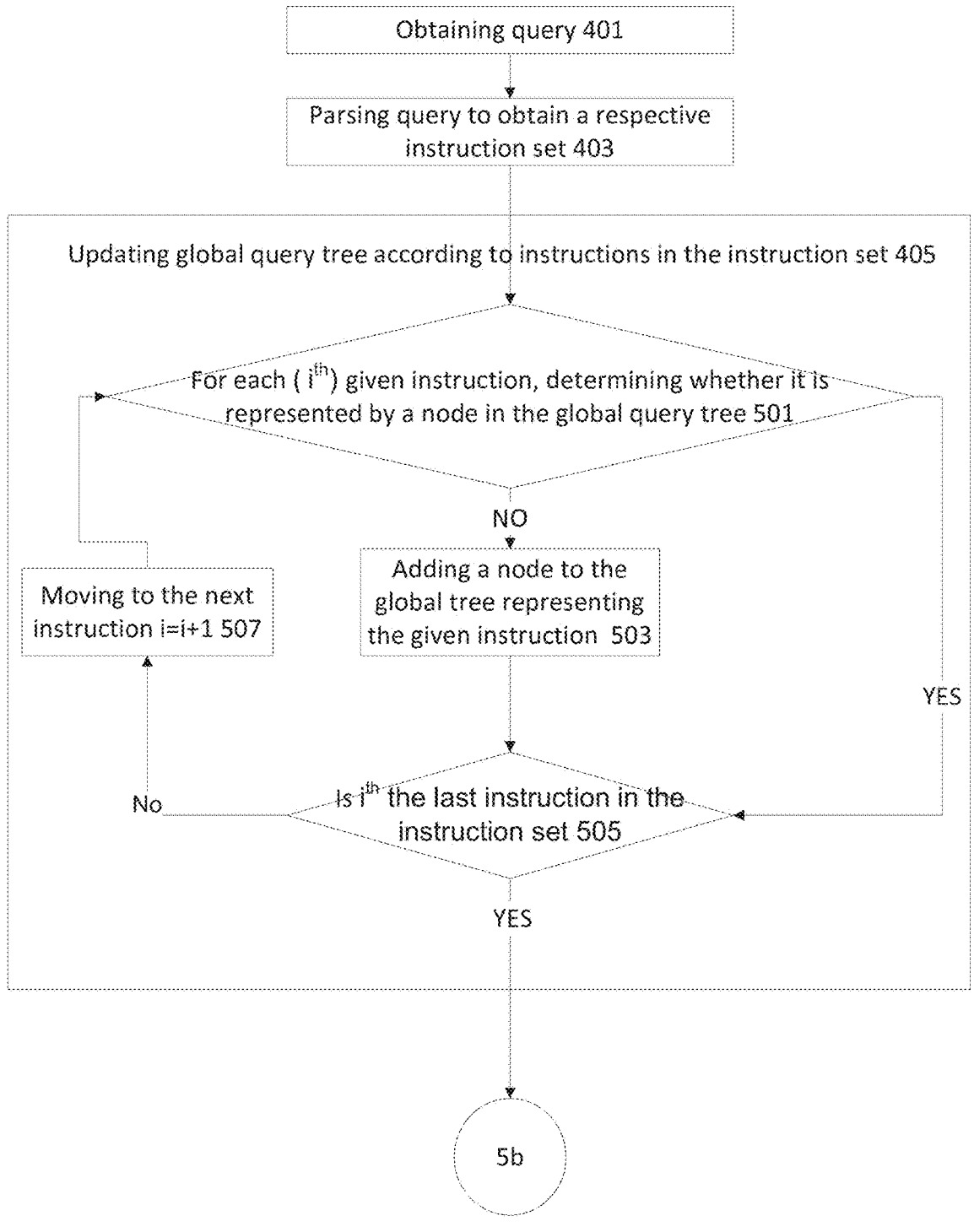
FIG. 5a is a flowchart of operations carried out in an updating procedure, according to examples of the presently disclosed subject matter.

For each processed query, the global query tree is updated (block 405) (e.g. with the help of query tree generator 318) according to the instructions included in the respective instruction set of the query, as described in greater detail with respect to FIG. 5a. Responsive to receiving a query, the global query tree is updated, if necessary, to include a node for each instruction in the instruction set. Notably, accordingly to the presently disclosed subject matter, nodes representing a given instruction may exist in the query tree while the respective instruction data has been evicted from the computer memory and is not available.

At block 407 instructions are executed (e.g. with the help of execution engine 322). During execution of the instructions (block 407) part or all of the nodes representing instruction of a processed query, are traversed. If necessary, for calculating a needed instruction result, nodes which represent instructions that their respective instruction data is not available in the computer memory, are executed, while nodes which represent instructions that their respective intermediates are available in the computer memory, are not executed, and the instruction data is retrieved from the computer memory. The final query result is based on the collection of instruction results obtained for different instructions in the instruction set (block 409).

Attention is now drawn to FIGS. 5 (5a and 5b), which is a flowchart of a more detailed example of operations performed during query execution according to the presently disclosed subject matter. It is noted that FIG. 5 is a non-limiting example intended to demonstrate certain principles of query execution as disclosed herein. However, certain modifications can be made to the specific operations which are disclosed, and thus the specific operations should not be construed as limiting in any way. For example, the same principles can be achieved by using either a bottom up approach starting the search from the query tree leaves and moving up towards the root, as well as a top to bottom approach starting at the root(s) of the query tree.

FIG. 5a provides a more detailed description of the operations of a query tree updating procedure, described above with reference to block 405 of FIG. 4. Similar to FIG. 4, upon receiving a query (block 401) the query is processed (block 403) to obtain an instruction set. The global query tree is updated (block 405) according to the instructions in the instruction set giving rise to an updated query tree.

According to some examples, for each given instruction in the instruction set, the query kernel 312 is configured to determine whether the instruction is already represented by a node in the global query tree (block 501). If not, a new node representing the instruction is added to the global query tree (block 503).

The new node can be also marked to be later identified as a query specific leaf node i.e. a node representing an instruction in the instruction set of the processed query. Since instruction data of a new node is not available, the node can also be flagged to be later identified as an instruction that its respective instruction result is not available in the computer memory. As would be clear to any person skilled in the art, in addition to or instead of flagging nodes which are destined for execution, it is likewise possible to flag nodes which are not destined for execution.

Otherwise, if a given instruction is already represented by a node in the global query tree, the relevant node is marked to be later identified as a query specific node, or a query specific leaf node, depending on its position. Also the relevant node can be marked to indicate whether the respective instruction result is available in the memory or not.

Notably, during an eviction process (which can be executed asynchronously from the query execution process) when intermediates results are evicted, a node representing an evicted intermediate can be flagged to indicate that the respective instruction data is not available. The process then moves on to the next instruction in the instruction set (block 507).

According to some examples, as part of the global query tree update process, a query-specific query tree can be generated for each query. The query-specific query tree comprises one or more nodes, each node representing a respective instruction in the instruction set of a given query. The query-specific query tree can be generated as a separate query tree. Alternatively, a separate query tree is not necessarily generated and the query-specific tree can be integrated within the global query tree by marking in the global query tree the nodes of to the query-specific tree and adding to the query-specific tree node which are missing from the global query tree, giving rise to an updated global query tree.

Figure 6:
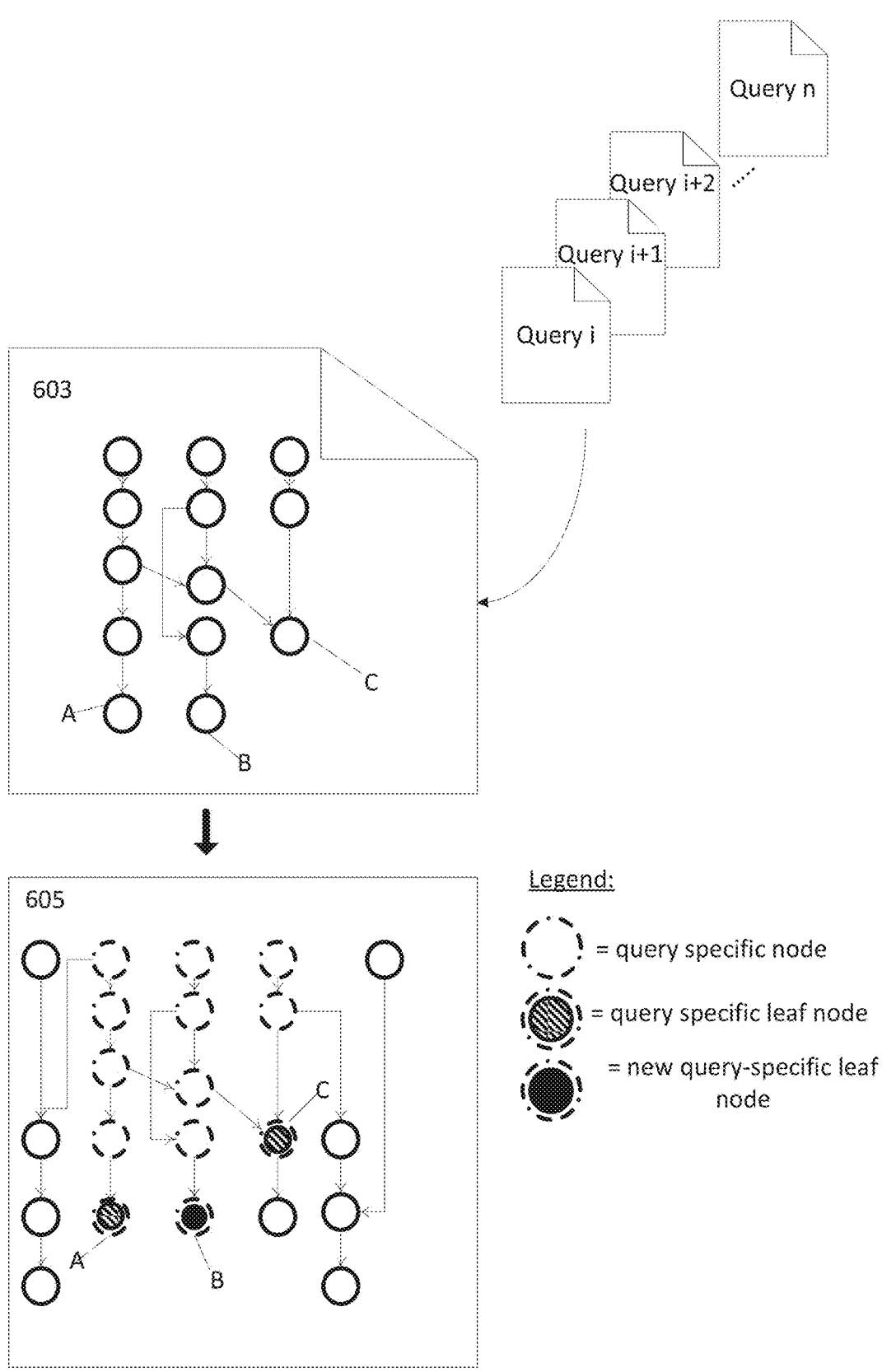
FIG. 6 is a schematic illustration exemplifying a query update process, according to examples of the presently disclosed subject matter.

FIG. 6 is a schematic illustration exemplifying a query update process, according to examples of the presently disclosed subject matter. Each one of queries i to query n, received by system 300 are processed by query kernel 312 for generating a respective instruction set. In the examples shown in FIG. 6 a query-specific query tree 603 is generated. The query-specific query tree 603 is then incorporated in the global query tree to create an updated global query tree 605. In FIG. 6, query specific nodes are indicated by circles with broken lines.

Query-specific leaf nodes are nodes which are located at the lowest level in the query-specific tree but are not necessarily leaf nodes in the global query tree. Query-specific leaf nodes (A, B and C) are indicated in FIG. 6 by an inner circle inside the outer jagged circle. Notably, node C is a leaf node in the query-specific query tree and is not a leaf node in the global query tree. Leaf node B (indicated by a solid black inner circle) which is a leaf node in the query-specific query tree, represents a new instruction executed for the first time, and is a leaf node also in the global query tree.

Figure 5B:
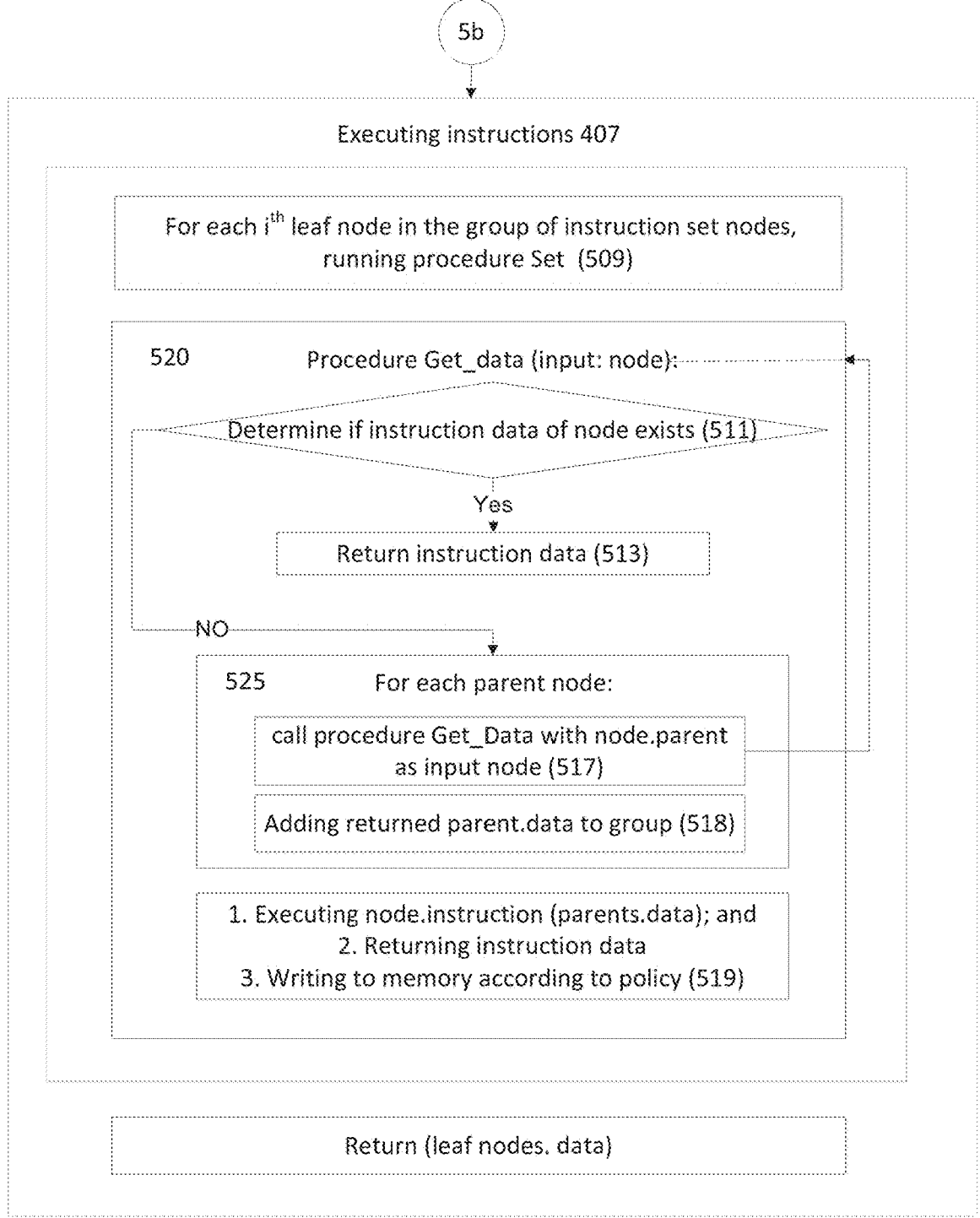
FIG. 5b is a flowchart of operations carried out in an execution procedure, according to examples of the presently disclosed subject matter.

Turning now to FIG. 5b, this illustrates an example of operations performed in accordance with blocks 407 and 409 of FIG. 4 described above. According to the illustrated example, at least part of the global query tree is traversed starting from the query-specific leaf nodes. Notably, any suitable techniques for traversing nodes in a graph (or a tree) can be used for this purpose. While FIG. 5b demonstrates a recursive algorithm, iterative algorithms can be likewise implemented. As mentioned above, according to one example, query-specific leaf nodes can be marked as such during the update process described above with reference to FIG. 5a.

At block 509, for each node (input node) from the group of query-specific leaf nodes, a procedure dedicated to obtaining the respective instruction data is executed. For simplicity, this procedure is named here "Get_Data". Block 520 comprises the operations performed as part of the procedure "Get_Data".

At block 511 it is determined whether instruction data of the input node exists in the computer memory. As explained above, according to one example, during the update procedure and during an eviction process, nodes which do not have their respective instruction data in the computer memory, are flagged.

At block 513, if a respective instruction data is available in the computer memory, the data is returned. The returned instruction data can be stored in the computer memory in a designated data structure to be later used when providing the final query result.

Optionally, in the event that respective instruction data is found in the computer memory, the input node can be locked to prevent deletion of the corresponding instruction data. The locking ensures that the instruction data represented by the node is not evicted from the computer memory before the query result is calculated and the node is unlocked. The input node can be unlocked after the processing of the query is completed.

Otherwise, if the respective instruction data of the input node is not available in the computer memory, in block 525 the process iterates over the parent nodes of the input node. If a parent node indeed exists, the Get_Data procedure is called with the parent node (node.parent) as input (block 517) in order to retrieve the intermediate of the parent (also referred to herein as an "earlier intermediate").

At block 518, intermediates of multiple parent nodes (parent.data) which are returned, are added to a group of parent's intermediates (parent.data.group), which is stored in a computer memory (e.g. temporary computer storage such as cache memory).

Once instruction data of all parent nodes is available (all parent nodes have been traversed) the procedure turns to block 519 where the instruction data of the input node (e.g. query specific leaf node i) is calculated using the retrieved parents node's instruction data. The calculated instruction data of the input node is returned, providing the instruction data of the query specific leaf node i.

Optionally, newly calculated intermediates can be stored in a computer memory and maintained, even after the instruction data of their respective descendent node has been calculated. In one example, a predefined policy can be used, defining which intermediates should be stored and which should be discarded after calculation. Similar principles of those used for eviction policies can be used here as well. ADD Claim.

The operations described with reference to block 520 are repeated for each one of the nodes in the group of query specific leaf nodes. Once all leaf nodes in the group of query specific leaf nodes are processed, the flow proceeds to block 409, where the final query result is provided.

Notably, the instruction data of each query specific leaf node can be displayed as a column of data values. Thus, according to one example, the final query result can be displayed (on a suitable display device operatively connected to query kernel 312) as a table where each column in the table comprises the values retrieved for a given query specific leaf node. According to one example, an export result node can be added to the query tree. This node is an artificial node representing the query result and is linked to all query specific leaf nodes of given instruction set nodes representing a query. The query result can be thus obtained by accessing the export result node and retrieving the instruction data from all the nodes linked to it.

Figure 7A:
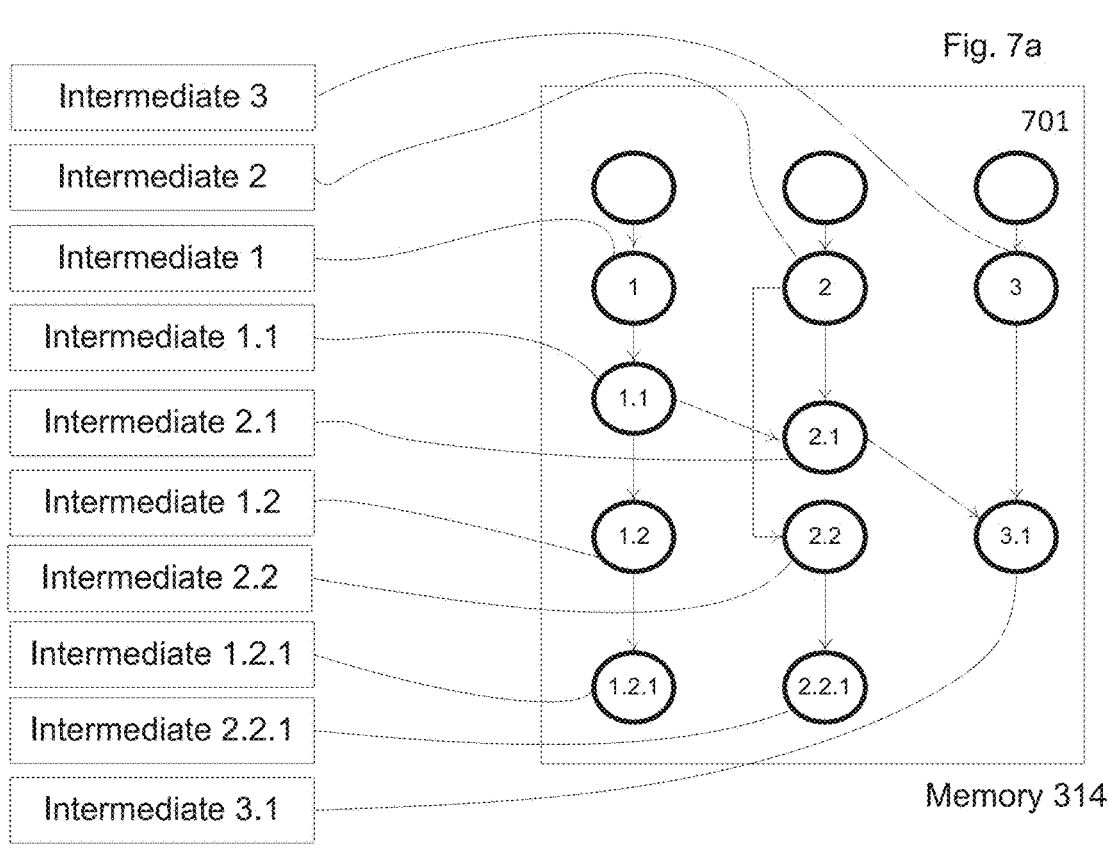
FIGS. 7a and 7b are schematic illustrations exemplifying an eviction process where nodes and instruction data are deleted together, according to an example of the presently disclosed subject matter.

Proceeding to FIG. 7*a*, this is a schematic illustration of computer memory 214 storing intermediate query results, each intermediate being linked to a respective node in query tree 220 logically representing the intermediates. According to the illustrated example there are a number of intermediate query results currently stored in the computer memory, intermediates 1, 1.1, 1.2, 1.2.1, 2, 2.1, 2.2, 2.2.1, 3 and 3.1. The hierarchy of the stored intermediates is apparent from the respective nodes representing each intermediate in the query tree 701.

Figure 7B:
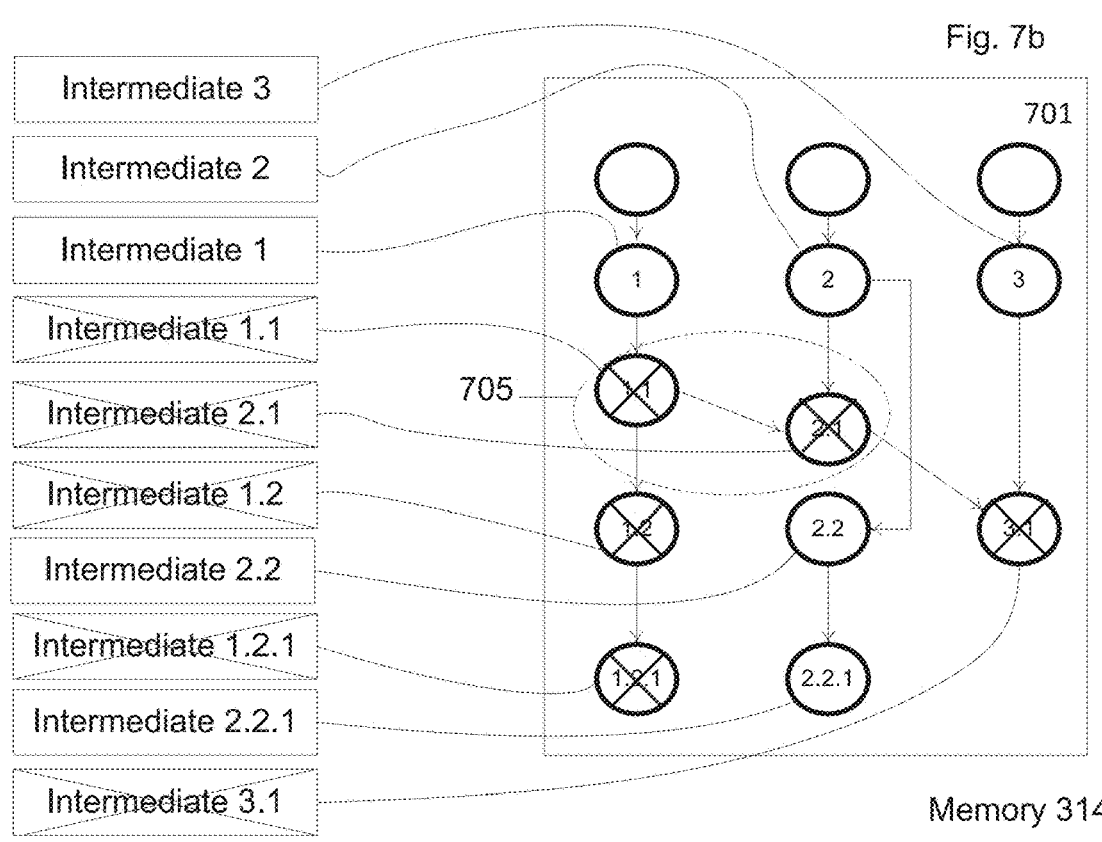

FIG. 7*b* is a schematic illustration of computer memory 214 following the execution of a deletion command (eviction) where both the node and the respective instruction data are deleted together. According to the current example the deletion command instructs to delete all intermediates located at the middle level of the tree, including intermediate 1.1 and intermediate 2.1 (indicated by elliptic FIG. 705).

Intermediate 1.1 and intermediate 2.1 are deleted along with their respective nodes in global query tree 701. As a result of this deletion their children nodes are cut off from the tree and are therefore deleted (i.e. node 1.2, 1.2.1, and node 3.1), as well as the respective intermediate query results represented by these nodes. Thus, the result of this deletion, in addition to the desired freeing of memory space, is performance degradation due to loss of additional instruction data.

Figure 7C:
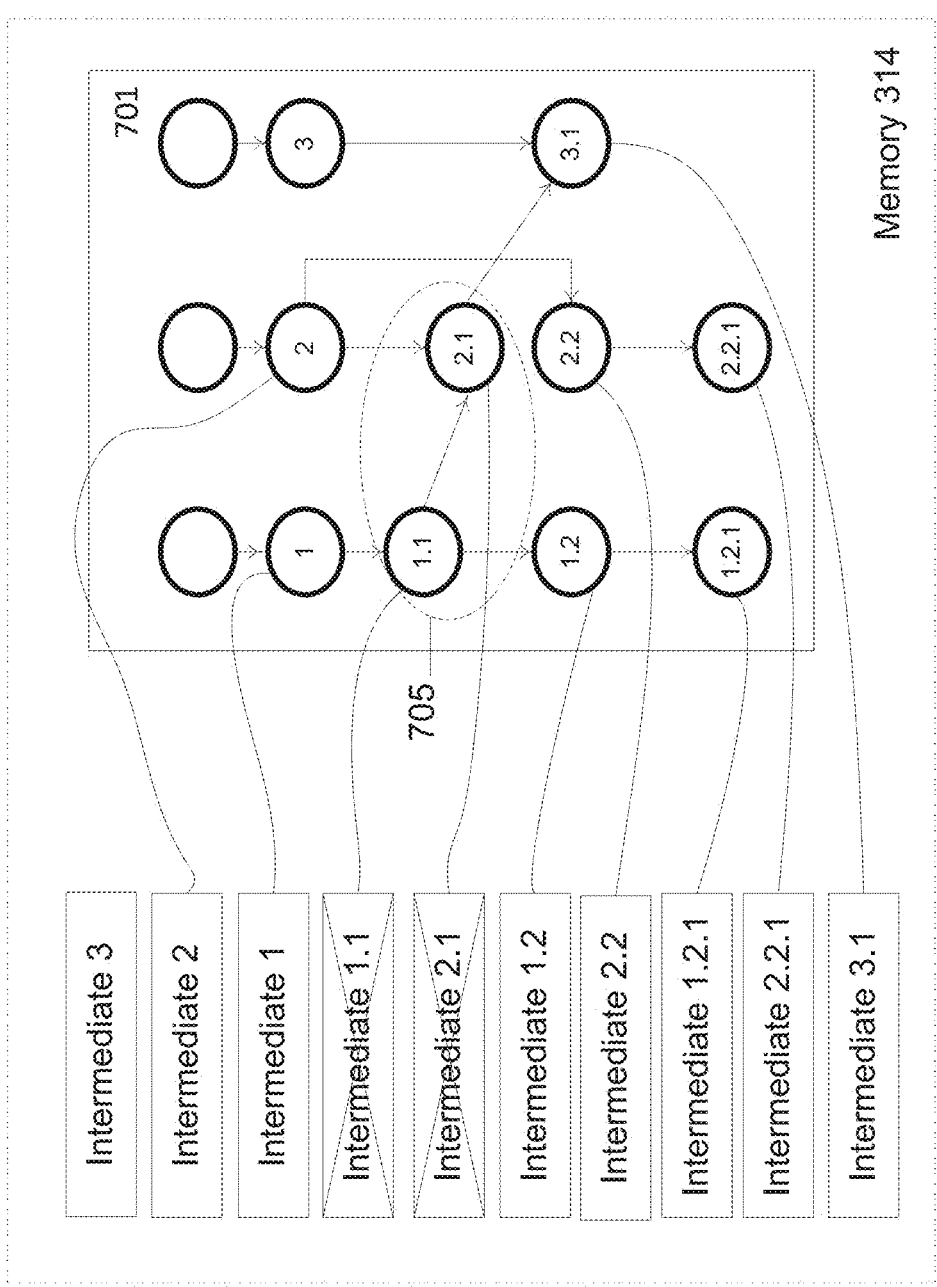
FIG. 7c is a schematic illustration exemplifying an eviction process where node and instruction data are not deleted together, according to examples of the presently disclosed subject matter.

FIG. 7*c* is a schematic illustration of computer memory 214 after the execution of a deletion command, according to examples of the presently disclosed subject matter. Different than the example shown in FIG. 7*b*, here nodes are not deleted during the deletion of an intermediate query result. As illustrated in FIG. 7*c* although intermediate results 1.1 and 2.1 were deleted, their respective nodes are retained in the query tree. Thus, intermediate query results represented by the children nodes of nodes representing the deleted intermediates (nodes 1.1 and 2.1) continue to be accessible in the computer memory and can be used for recycling during future queries. As illustrated in FIG. 7*c* intermediates 1.2, 1.2.1 and 3.1 are available in the computer memory, although intermediates 1.1 and 2.1 were deleted.

FIG. 8 is a flowchart showing a sequence of operations carried out during a memory eviction process, according to examples of the presently disclosed subject matter. Operations illustrated with reference to FIG. 8 can be executed for example by the system described above with reference to FIG. 3. For instance, eviction manager 324 can be configured to implement one or more eviction policies.

At block 801 a deletion command is received instructing to delete one or more intermediate query results. The command can be received for example as part of an eviction procedure (executed for example by eviction manager 324), implemented according to some predefined eviction policy. In response to the deletion command, at least one intermediate query result is deleted from the computer memory. The node representing the deleted intermediate query result in the global query tree is not deleted and is maintained linked to the global query tree (block 803). The node's metadata can be updated to include an indication that the respective intermediate query result has been deleted and is no longer available in the computer memory.

The presently disclosed subject matter enables to separate between the operation of a recycler (responsible for managing the query execution while using previously calculated instruction data) and the operation of the eviction manager in a DBMS system. Data can be evicted from the computer memory while the effect of the eviction on the ability to recycle instructions is reduced, and thus the operation of the eviction manager is considerably less dependent on the desired recycling capabilities.

The presently disclosed subject matter also enables to implement a variety of eviction policies without any cost to the recycling capability, which is inherent to their implementation according to the previously known art. These eviction policies are practical due to the fact that nodes representing deleted intermediate query results are maintained in the global query tree. This allows keeping track and maintaining access to intermediate query results which are stored in the computer memory, even when intermediates which are higher in the hierarchy have been deleted.

For example, the effect of the deletion of top memory-consuming intermediates on recycling is considerably reduced. This is so, since even if nodes representing top memory-consuming intermediates are located high in the global query tree (and thus serve as parent nodes to many other nodes of lower hierarchy), only the intermediates are deleted, while the respective nodes are maintained in the tree. In general, lower level nodes (e.g. leaf nodes) represent intermediate results of more recent queries and therefore are likely to be more frequently used by subsequent queries. Since nodes are not deleted from the global query tree, the low level nodes can be accessed and their respective intermediates, which are stored in the computer memory, can be retrieved and used when executing a query.

An intermediate can be defined as a top memory-consuming intermediate for example, based on the absolute value of the memory space the intermediate consumes (e.g. memory space which is greater than a predefined value can be defined as top-memory consumer) and/or based on the relative memory consumption of the intermediate (e.g. a predefined number of intermediates which consume the greatest memory space can be defined as the top consumer intermediates and deleted during eviction).

Likewise, using a least recently used (LRU) eviction policy is made possible, since even if LRU nodes are located high in the tree, only the intermediates are deleted, while the respective nodes are maintained in the tree.

Another eviction policy which is made practical is a "leaves only eviction policy". According to this policy, only intermediates represented by leaf nodes are retained in the computer memory, while higher level intermediates are deleted. As the leaves are nodes located at the lowest level of the global query tree, recalculating the instruction data of a leaf node may be a processing intensive task as it would require calculating all intermediates along the path from the root node to the leaf node. On the other hand, leaves are likely to be relatively light on memory consumption. Furthermore, as explained above, it is likely that new queries would depend on existing leaves (this assumption becomes more valid as the global query tree becomes older). Thus, it is often advantageous to maintain the intermediate query results represented by leaf nodes.

Additional examples of eviction policies which become practical according to the presently disclosed subject matter include:

An eviction policy based on a combination of an LRU eviction policy and a rule instructing to always maintain leaves in the global query tree.

An eviction policy based on a combination of memory consumption and processing intensiveness. According to this policy, it is determined whether or not to delete intermediates based on the intermediates' memory consumption parameter and processing intensiveness parameter. Intermediates which are high memory consumers, and which do not require intensive processing during their execution, are evicted. Different weights can be given to the memory space parameter and to the processing intensiveness parameter for determining the priority of each parameter in the determination as to whether a given intermediate should be evicted or not. Memory consumption level can be determined based on a predefined threshold (e.g. an intermediate which consumes memory space which is greater than a predefined threshold). Likewise, processing intensiveness for calculating intermediates can be determined based on one or more predefined thresholds (e.g. based on an estimated processing time).

An eviction policy based on "prolificacy" of the intermediate result. The prolificacy of a given intermediate result can be measured based on the number of nodes which diverge from a node representing a given intermediate. The greater this number, the greater the prolificacy of the node. Prolific intermediates are frequently used during calculation of new queries and therefore are likely to be needed for calculating new queries in the future. According to this eviction policy, intermediates represented by highly prolific nodes (e.g. nodes having more than a predefined number of descendant nodes) are retained in the computer memory. Notably, the presently disclosed subject matter further contemplates any combinations of eviction policies.

It is to be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable non-transitory memory tangibly embodying a program of instructions executable by the machine for executing the method of the presently disclosed subject matter.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computerized method of managing a cache of a column-oriented database; the cache being adapted to store at least one or more intermediates, each intermediate being an intermediate query result generated by execution of a respective instruction, the instruction being part of a given Structured Query Language (SQL) query for information from the column-oriented database; the method comprising, using a computer processor for:

generating a hierarchical data-structure and storing the hierarchical data-structure in a computer memory; wherein different nodes in the hierarchical data-structure represent different respective intermediates at least some of which are stored in the cache and wherein each of the different respective intermediates is at least initially stored in the cache;

responsive to a delete command, the delete command instructing to delete at least one of the intermediates that were at least initially stored in the cache from the cache, deleting the at least one intermediate from the cache;

responsive to the delete command, maintaining in the hierarchical data-structure a respective node representing the at least one intermediate whereby there is no intermediate that corresponds to the respective node available in the cache;

flagging the respective node representing the at least one intermediate, the flagging being indicative that there is no intermediate that corresponds to the flagged respective node available in the cache; and executing an SQL database query, wherein executing the SQL database query comprises:

dividing the SQL database query into one or more instructions to generate a respective instruction set;

updating the hierarchical data-structure giving rise to an updated data-structure, wherein each instruction from among a group of instructions is represented by a respective node in the updated data-structure;

for each instruction in the instruction set, determining a respective intermediate, comprising:

when a respective intermediate is available in the cache, retrieving the intermediate from the cache;

otherwise, when a respective intermediate is not available in the cache, executing the instruction to determine a respective intermediate; and providing the query result using the determined intermediates;

wherein each instruction in the instruction set is represented by a query-specific leaf node in the hierarchical data-structure, and wherein executing the instruction comprises:

for each query-specific leaf node, when a respective intermediate represented by the leaf node is not available in the cache, retrieving from the cache one or more earlier intermediates, the one or more earlier intermediates being represented by one or more respective parent nodes of the query-specific leaf node; and using the one or more earlier intermediates for calculating the respective intermediate represented by the query specific leaf node;

flagging one or more nodes in the updated data structure, the flagging being indicative whether or not an intermediate represented by a given node is available in the cache;

wherein the hierarchical data-structure is a directed acyclic graph data-structure;

wherein the deletion command is executed according to a predefined eviction policy, the eviction policy comprising one or more rules for evicting intermediates from the cache in order to clear cache space, wherein the one or more rules comprise a rule instructing to maintain in the cache only intermediates represented in the hierarchical data-structure by leaf nodes, wherein the one or more rules comprise a rule instructing to determine whether to delete an intermediate from the cache based on a combination of parameters characterizing the intermediate, comprising: a processing intensiveness parameter and a cache consumption parameter, and wherein the one or more rules further include a weight factor for each one of the parameters.

2. The method according to claim 1 wherein the column-oriented database is a MonetDB database.

3. A processing unit of a column-oriented database management system configured to manage a cache, the cache being adapted to store at least one or more intermediates, each intermediate being an intermediate query result generated by execution of a respective instruction, the instruction being part of a given Structured Query Language (SQL) query for information from the column-oriented database;

the processing unit being operatively connected to at least one computer processor and configured to:

generate a hierarchical data-structure and storing the hierarchical data-structure in a computer memory; wherein different nodes in the hierarchical data-structure represent different respective intermediates at least some of which are stored in the cache and wherein each of the different respective intermediates is at least initially stored in the cache;

responsive to a delete command, the delete command instructing to delete at least one of the intermediates that were at least initially stored in the cache from the cache, delete the at least one intermediate from the cache;

responsive to the delete command, maintain in the hierarchical data-structure a respective node representing the at least one intermediate whereby there is no intermediate that corresponds to the respective node available in the cache;

flag the respective node representing the at least one intermediate, the flagging being indicative that there is no intermediate that corresponds to the flagged respective node available in the cache; and execute an SQL database query, wherein to execute the SQL database query the processor is further configured to:

divide the SQL database query into one or more instructions to generate a respective instruction set;

update the hierarchical data-structure giving rise to an updated data-structure, wherein each instruction from among a group of instructions is represented by a respective node in the updated data-structure;

for each instruction in the instruction set, determine a respective intermediate, comprising:

when a respective intermediate is available in the cache, retrieve the intermediate from the cache;

otherwise, when a respective intermediate is not available in the cache, execute the instruction to determine a respective intermediate; and provide the query result using the determined intermediates;

wherein each instruction in the instruction set is represented by a query-specific leaf node in the hierarchical data-structure, and wherein to execute the instruction the processor if further configured to:

for each query-specific leaf node, when a respective intermediate represented by the leaf node is not available in the cache, retrieve from the cache one or more earlier intermediates, the one or more earlier intermediates being represented by one or more respective parent nodes of the query-specific leaf node; and use the one or more earlier intermediates for calculating the respective intermediate represented by the query specific leaf node;

flag one or more nodes in the updated data structure, the flagging being indicative whether or not an intermediate represented by a given node is available in the cache;

wherein the hierarchical data-structure is a directed acyclic graph data-structure;

wherein the deletion command is executed according to a predefined eviction policy, the eviction policy comprising one or more rules for evicting intermediates from the cache in order to clear cache space, wherein the one or more rules comprise a rule instructing to maintain in the cache only intermediates represented in the hierarchical data-structure by leaf nodes, wherein the one or more rules comprise a rule instructing to determine whether to delete an intermediate from the cache based on a combination of parameters characterizing the intermediate, comprising: a processing intensiveness parameter and a cache consumption parameter, and wherein the one or more rules further include a weight factor for each one of the parameters.

4. A database management system comprising a query kernel of a column-oriented database management system configured to manage a cache, the cache being adapted to store at least one or more intermediates, each intermediate being an intermediate query result generated by execution of a respective instruction, the instruction being part of a given Structured Query Language (SQL) query for information from the column-oriented database; the query kernel being operatively connected to at least one computer processor and configured to:

generate a hierarchical data-structure and storing the hierarchical data-structure in a computer memory; wherein different nodes in the hierarchical data-structure represent different respective intermediates at least some of which are stored in the cache and wherein each of the different respective intermediates is at least initially stored in the cache;

responsive to a delete command, the delete command instructing to delete at least one of the intermediates that were at least initially stored in the cache from the cache, delete the at least one intermediate from the cache;

responsive to the delete command, maintain in the hierarchical data-structure a respective node representing the at least one intermediate whereby there is no intermediate that corresponds to the respective node available in the cache;

flag the respective node representing the at least one intermediate, the flagging being indicative that there is no intermediate that corresponds to the flagged respective node available in the cache; and execute an SQL database query, wherein to execute the SQL database query the processor is further configured to:

divide the SQL database query into one or more instructions to generate a respective instruction set;

update the hierarchical data-structure giving rise to an updated data-structure, wherein each instruction from among a group of instructions is represented by a respective node in the updated data-structure;

for each instruction in the instruction set, determine a respective intermediate, comprising:

when a respective intermediate is available in the cache, retrieve the intermediate from the cache;

otherwise, when a respective intermediate is not available in the cache, execute the instruction to determine a respective intermediate; and provide the query result using the determined intermediates;

wherein each instruction in the instruction set is represented by a query-specific leaf node in the hierarchical data-structure, and wherein to execute the instruction the processor if further configured to:

for each query-specific leaf node, when a respective intermediate represented by the leaf node is not available in the cache, retrieve from the cache one or more earlier intermediates, the one or more earlier intermediates being represented by one or more respective parent nodes of the query-specific leaf node; and use the one or more earlier intermediates for calculating the respective intermediate represented by the query specific leaf node;

flag one or more nodes in the updated data structure, the flagging being indicative whether or not an intermediate represented by a given node is available in the cache;

wherein the hierarchical data-structure is a directed acyclic graph data-structure;

wherein the deletion command is executed according to a predefined eviction policy, the eviction policy comprising one or more rules for evicting intermediates from the cache in order to clear cache space, wherein the one or more rules comprise a rule instructing to maintain in the cache only intermediates represented in the hierarchical data-structure by leaf nodes, wherein the one or more rules comprise a rule instructing to determine whether to delete an intermediate from the cache based on a combination of parameters characterizing the intermediate, comprising: a processing intensiveness parameter and a cache consumption parameter, and wherein the one or more rules further include a weight factor for each one of the parameters.

5. A non-transitory program storage device readable by a machine, tangibly embodying a program of instructions executable by the machine to perform method steps of managing cache of a column-oriented database the cache being adapted to store at least one or more intermediates, each intermediate being an intermediate query result generated by execution of a respective instruction, the instruction being part of a given Structured Query Language (SQL) query for information from the column-oriented database; the method comprising:

generating a hierarchical data-structure and storing the hierarchical data-structure in a computer memory; wherein different nodes in the hierarchical data-structure represent different respective intermediates at least some of which are stored in the cache and wherein each of the different respective intermediates is at least initially stored in the cache;

responsive to a delete command, the delete command instructing to delete at least one of the intermediates that were at least initially stored in the cache from the cache, deleting the at least one intermediate from the cache;

responsive to the delete command, maintaining in the hierarchical data-structure a respective node representing the at least one intermediate whereby there is no intermediate that corresponds to the respective node available in the cache;

flagging the respective node representing the least one intermediate, the flagging being indicative that there is no intermediate that corresponds to the flagged respective node available in the cache; and executing an SQL database query, wherein executing the SQL database query comprises:

dividing the SQL database query into one or more instructions to generate a respective instruction set;

updating the hierarchical data-structure giving rise to an updated data-structure, wherein each instruction from among a group of instructions is represented by a respective node in the updated data-structure;

for each instruction in the instruction set, determining a respective intermediate, comprising:

when a respective intermediate is available in the cache, retrieving the intermediate from the cache;

otherwise, when a respective intermediate is not available in the cache, executing the instruction to determine a respective intermediate; and providing the query result using the determined intermediates;

wherein each instruction in the instruction set is represented by a query-specific leaf node in the hierarchical data-structure, and wherein executing the instruction comprises:

for each query-specific leaf node, when a respective intermediate represented by the leaf node is not available in the cache, retrieving from the cache one or more earlier intermediates, the one or more earlier intermediates being represented by one or more respective parent nodes of the query-specific leaf node; and using the one or more earlier intermediates for calculating the respective intermediate represented by the query specific leaf node;

flagging one or more nodes in the updated data structure, the flagging being indicative whether or not an intermediate represented by a given node is available in the cache;

wherein the hierarchical data-structure is a directed acyclic graph data-structure;

wherein the deletion command is executed according to a predefined eviction policy, the eviction policy comprising one or more rules for evicting intermediates from the cache in order to clear cache space, wherein the one or more rules comprise a rule instructing to maintain in the cache only intermediates represented in the hierarchical data-structure by leaf nodes, wherein the one or more rules comprise a rule instructing to determine whether to delete an intermediate from the cache based on a combination of parameters characterizing the intermediate, comprising: a processing intensiveness parameter and a cache consumption parameter, and wherein the one or more rules further include a weight factor for each one of the parameters.

6. The method according to claim 1, wherein each and every one of the different respective intermediates is at least initially stored in the cache.

7. The method according to claim 1, wherein each and every one of the different respective intermediates is at least initially stored in the cache even after the cache initially became full.

8. The processing unit according to claim 3, wherein each and every one of the different respective intermediates is at least initially stored in the cache.

9. The processing unit according to claim 3, wherein each and every one of the different respective intermediates is at least initially stored in the cache even after the cache initially became full.

10. The database management system according to claim 4, wherein each and every one of the different respective intermediates is at least initially stored in the cache.

11. The database management system according to claim 4, wherein each and every one of the different respective intermediates is at least initially stored in the cache even after the cache initially became full.

12. The non-transitory program storage device according to claim 5, wherein each and every one of the different respective intermediates is at least initially stored in the cache.

13. The non-transitory program storage device according to claim 5, wherein each and every one of the different respective intermediates is at least initially stored in the cache even after the cache initially became full.

* * * * *